United States Patent [19]

Giogoli et al.

[11] Patent Number: 5,881,473
[45] Date of Patent: Mar. 16, 1999

[54] DRYING DEVICE FOR A COATING MACHINE

[75] Inventors: Antonio Giogoli, Granarola Emilia; Angelo Scipioni, Osteria Grande, both of Italy

[73] Assignee: G.S. S.r.l. Coating System, Osteria Grande, Italy

[21] Appl. No.: 676,362

[22] PCT Filed: Dec. 29, 1994

[86] PCT No.: PCT/IT94/00220

§ 371 Date: Sep. 30, 1996

§ 102(e) Date: Sep. 30, 1996

[87] PCT Pub. No.: WO95/19713

PCT Pub. Date: Jul. 27, 1995

[30] Foreign Application Priority Data

Jan. 25, 1994 [IT] Italy ............................ B09400008 U

[51] Int. Cl.[6] .................................................. D06F 58/00
[52] U.S. Cl. ................................ 34/134; 34/595; 34/607; 165/89
[58] Field of Search ............................ 34/134, 595, 607; 165/89

[56] References Cited

U.S. PATENT DOCUMENTS 4,656,759  4/1987  Yamato ...................................... 34/134
4,916,831  4/1990  Yasumura et al. ......................... 34/134

FOREIGN PATENT DOCUMENTS

| 0 131 152 | 1/1985 | European Pat. Off. . |
| 0 132 480 | 2/1985 | European Pat. Off. . |
| 0 382 160 | 8/1990 | European Pat. Off. . |
| 2 030 033 | 10/1970 | France . |
| 2 222 957 | 10/1974 | France . |
| 2 505 613 | 11/1982 | France . |

*Primary Examiner*—Ronald Capossela
*Attorney, Agent, or Firm*—Nims, Howes, Collison Hansen & Lackert

[57] ABSTRACT

A drying device for a coating machine equipped with a rotary pan (1), in which the products to be coated are introduced, includes air injecting means (5) for supplying air to dry the products inside the rotary pan (1), and an exhaust air pipe (7), equipped with perforated hollow head pieces which can be removed, adapted to be immersed in a heap of products to be coated. The pipe (7) is supported by sliding means (21) which are moved in a direction longitudinal to the same pipe between a working position, in which the exhaust pipe (7) is operated, and an advanced position, so as to allow maintenance operation on the exhaust pipe (7) performed from outside through the front opening (3a) of the pan (1).

10 Claims, 4 Drawing Sheets

DRYING DEVICE FOR A COATING MACHINE

TECHNICAL FIELD

The present invention relates to a coating machine, used in particular for coating granulated material, e.g. pharmaceutical or confectionery, with a suitable layer of an outer coating.

BACKGROUND ART

Coating machines for pharmaceutical, confectionary and the like, are usually equipped with a rotary hollow drum, in which the products to be coated are introduced and sprayed with a liquid mixture aimed at forming the coating.

Inside the rotary drum, also called coating pan, the products are subsequently exposed to a stream of hot air, so as to cause drying of the coating layer.

In several drying devices used to perform this operation, the air is supplied in the pan and exhausted therefrom at a distance above the tumbling products.

Alternatively, the air is supplied and exhausted via suitably shaped bodies which are immersed in the heap of products.

In the European Patent N. 0.131.152, granted to the Applicant, there is disclosed a drying device in which the air is freely injected into the rotary pan, while it is exhausted by suitable perforated hollow bodies immersed in the heap of products.

Good results have been obtained by means of this device, in particular the coating speed has been increased and granular remains, usually left after the coating operation, have been avoided.

The hollow bodies are fastened (see e.g. the Application No. 21924A/89 of the Applicant) to respective tubular members, which are removably fixed to each other so as to define a pipe arranged in coaxial relation to the pan.

The air to be exhausted from the rotary pan and that is drawn off via the hollow bodies passes through the pipe.

The tubular members can be disassembled and the hollow bodies can be detached therefrom thus allowing to easily carry out cleaning and/or maintenance operations of the same hollow bodies and pipe.

When the rotary pan is small and/or medium in size, the operator can carry out the above mentioned disassembling operation directly through the front opening of the pan.

When the rotary pan is rather big in size, the above mentioned operations cannot be performed from outside, therefore it is necessary for the operator to enter the pan, with all the inconveniences resulting therefrom.

Consequently, performing inside cleaning operations, in particular of the air exhaust pipe, is very uncomfortable and difficult, specially with big rotary pans.

DISCLOSURE OF THE INVENTION

The object of the present invention is to propose a drying device for a coating machine, that allows to improve cleaning and/or maintenance operations, in particular as far as the drying air exhaust means are concerned.

The above mentioned objects are achieved by means of a drying device for a coating machine equipped with a rotary pan, in which the products to be coated are introduced, that includes air injecting means for supplying air to dry the products inside the rotary pan, and an exhaust air pipe equipped with perforated hollow head pieces which can be removed, adapted to be immersed in a heap of products to be coated.

The pipe is supported by sliding means which are moved in a direction longitudinal to the same pipe between a working position, in which the exhaust pipe is operated, and an advanced position, so as to allow maintenance operation on the exhaust pipe performed from outside through the front opening of the pan.

BRIEF DESCRIPTION OF THE DRAWINGS

The characteristic features of the present invention are pointed out in the following with reference to the enclosed drawings, in which.

BEST MODE OF CARRYING OUT THE INVENTION

Figure 1:
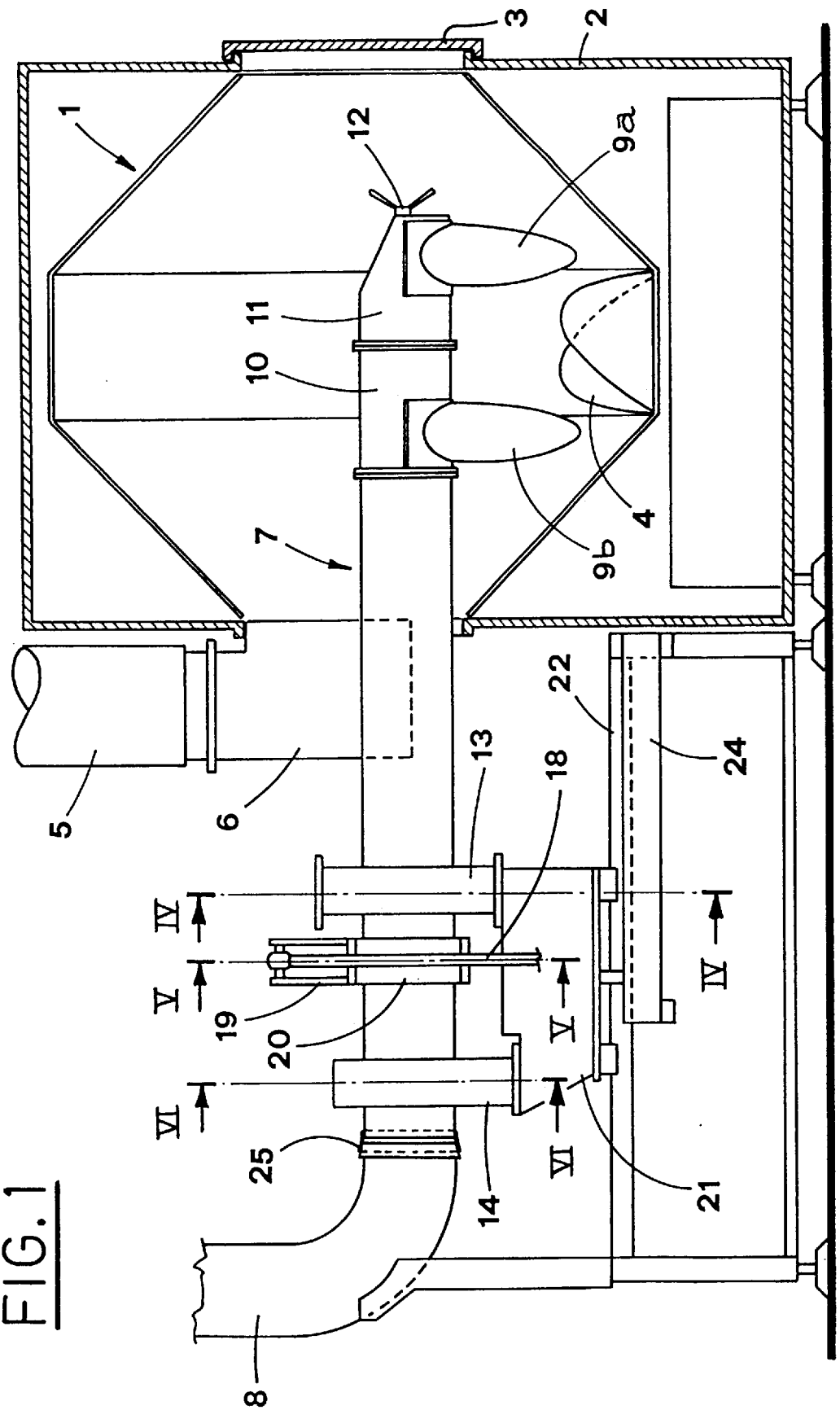
FIG. 1 shows a lateral sectional view of the drying device.

With reference to the above figures, the reference numeral 1 indicates the rotary pan, in which the products to be coated are inserted.

The pan 1, equipped with a door 3 aimed at allowing introduction of the products therein, is supported by a stationary frame 2, so that it axis is horizontal.

Inside the pan 1, there are vanes 4 that help mixing of the products during the pan rotation.

In its rear part, the rotary pan 1 is connected to a duct 5 for injecting of drying air into the free space of the pan 1 through an opening 6.

The drying air is sucked by an exhaust pipe 7 that, at one end enters the rotary pan 1 and, at the other end is connected to a discharge duct 8.

An intermediate tubular member 10 and an end tubular member 11 are connected in coaxial relation, one after the other and by means of flanged couplings, to the end of the pipe 7 located inside the pan 1, and they are removably fixed in their operating position by means of an axial tie-rod 12.

The pipe 7 is fed with air drawn off through a pair of hollow bodies, namely an end body 9a, radially extending from the said end tubular member 11, and an intermediate tubular body 9b, radially extending from the intermediate tubular member 10.

The head parts of the hollow bodies 9a, 9b are perforated and immersed in the tumbling heap of products to be treated.

It is to be pointed out that when the tubular members are set in the above mentioned operating position, the hollow bodies 9a, 9b are situated on opposite sides of the vanes 4 of the rotary pan 1 (see FIG. 1).

The exhaust pipe 7 is arranged longitudinally in respect to the rotation axis of the rotary pan 1, and is driven to oscillate around its axis so as to suitably orient the hollow bodies 9, when in operation, in respect to the vertical longitudinal plane and in direction of the heap of products, that changes according to the type of products to be coated.

In order to allow this operation, the exhaust pipe 7 is supported, in cantilevered position, by supporting means 13, 14, equipped with triads of rollers 15, 16, among which pipe 7 is set in a way that it can rotate.

Figure 4:
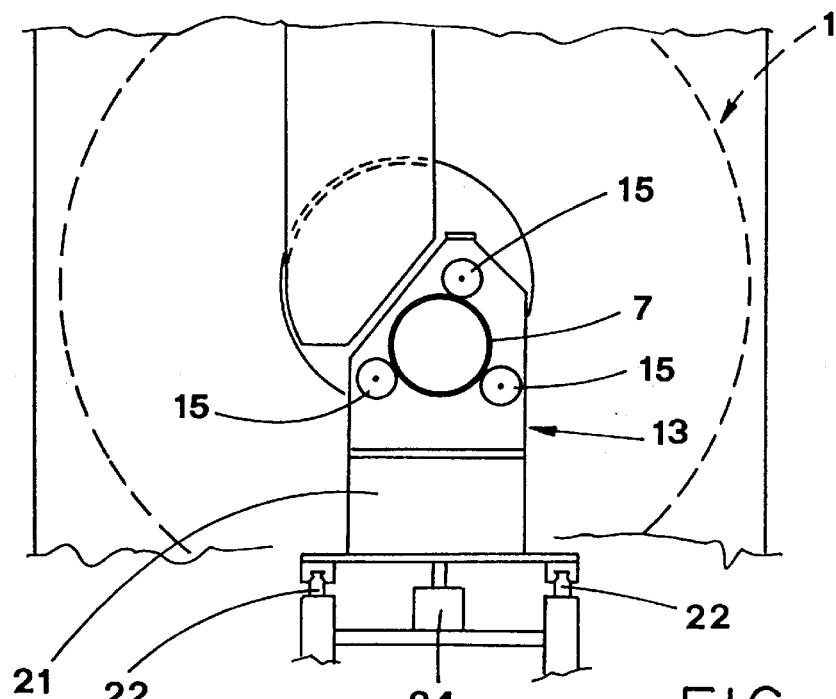
FIGS. 4, 5 and 6 show respective partial cross-section views of the subject device, taken along the lines IV—IV, V—V and VI—VI of FIG. 1.
Figure 6:
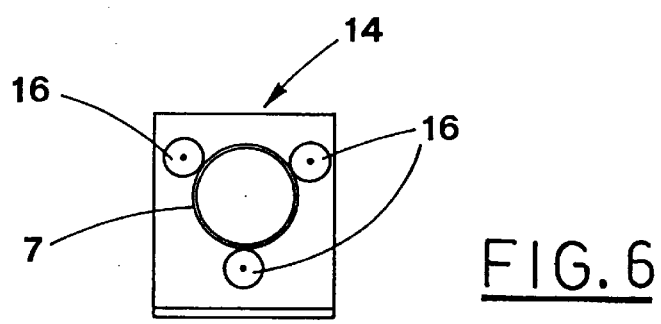

Preferably, the rollers 15 of each triad are staggered angularly with respect to the rollers 16 of the other triad (see FIGS. 4 and 6).

Figure 5:
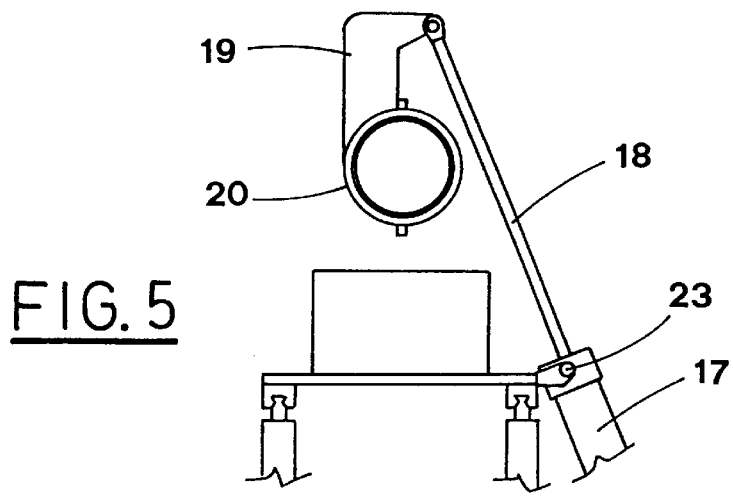

The pipe 7 is made to oscillate angularly by a jack 17, whose stem 18 is pivoted to a lever 19, connected to the outer surface of the pipe 7 by means of a ring 20 (see also FIG. 5).

The supporting means 13, 14 are fastened to a slide 21 that is carried slidably by a pair of longitudinal guides 22, integral with the stationary frame of the machine.

Also the jack 17 is hinged to the slide 21, on a pin 23.

The slide 21 is moved in opposed directions by a sliding type actuator means 24, situated longitudinally lined up with the guides 22.

Consequently, the exhaust pipe 7 can be axially moved between a withdrawn working position and an advanced position, in which cleaning operations are facilitated.

In the above mentioned working position, the pipe 7 is connected to the discharge duct 8 by means of a ring-like mouthpiece 25 and suitable sealing means.

In this position, the pipe 7 is rotated angularly by the jack 17, so as to orient the hollow bodies 9 in the direction of the heap of products to be coated inside the rotating pan 1.

The duct 5 supplies the rotary pan 1 with drying air, that passes, in known way, through the heap of products tumbling inside the same pan 1.

Then, the air is sucked through the perforated hollow bodies 9a, 9b, immersed in a heap of products, and subsequently, it is brought to the discharge opening of the pipe 7.

When cleaning and/or maintenance operations must be performed, the door 3, associated with the front opening 3a of the pan, is opened.

Figure 2:
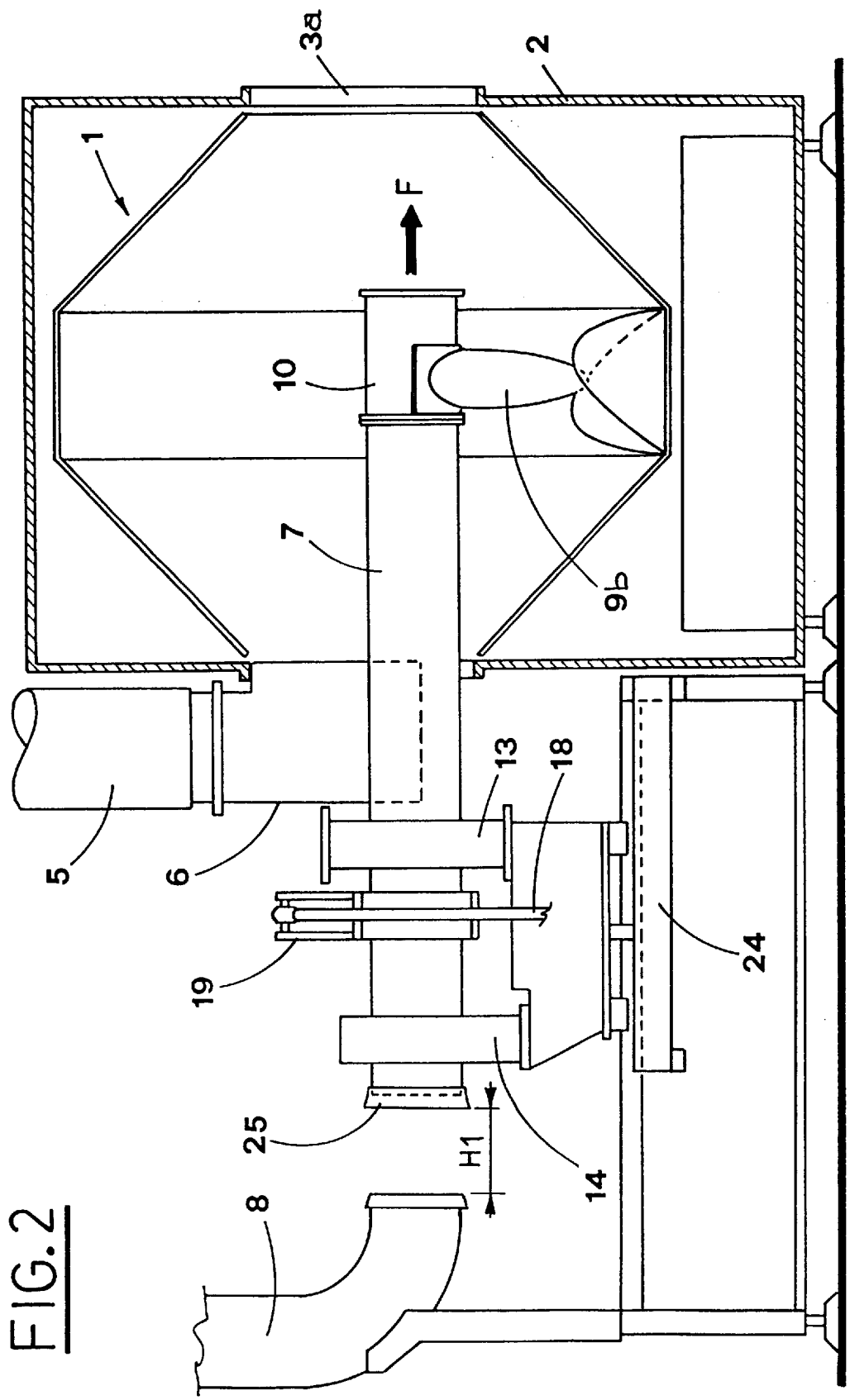
FIGS. 2 and 3 show the same view of the device, in different operative configurations.

Then the pipe 7 is moved (in the direction F) toward the opening 3a by a distance $H_1$ (FIG. 2).

In this way, through the opening 3a, the operator can disassemble the tubular section 11 from the adjacent tubular section 10; if it is desired, the end hollow body 9a can be previously removed from the respective tubular section 11, through the said opening 3a.

Figure 3:
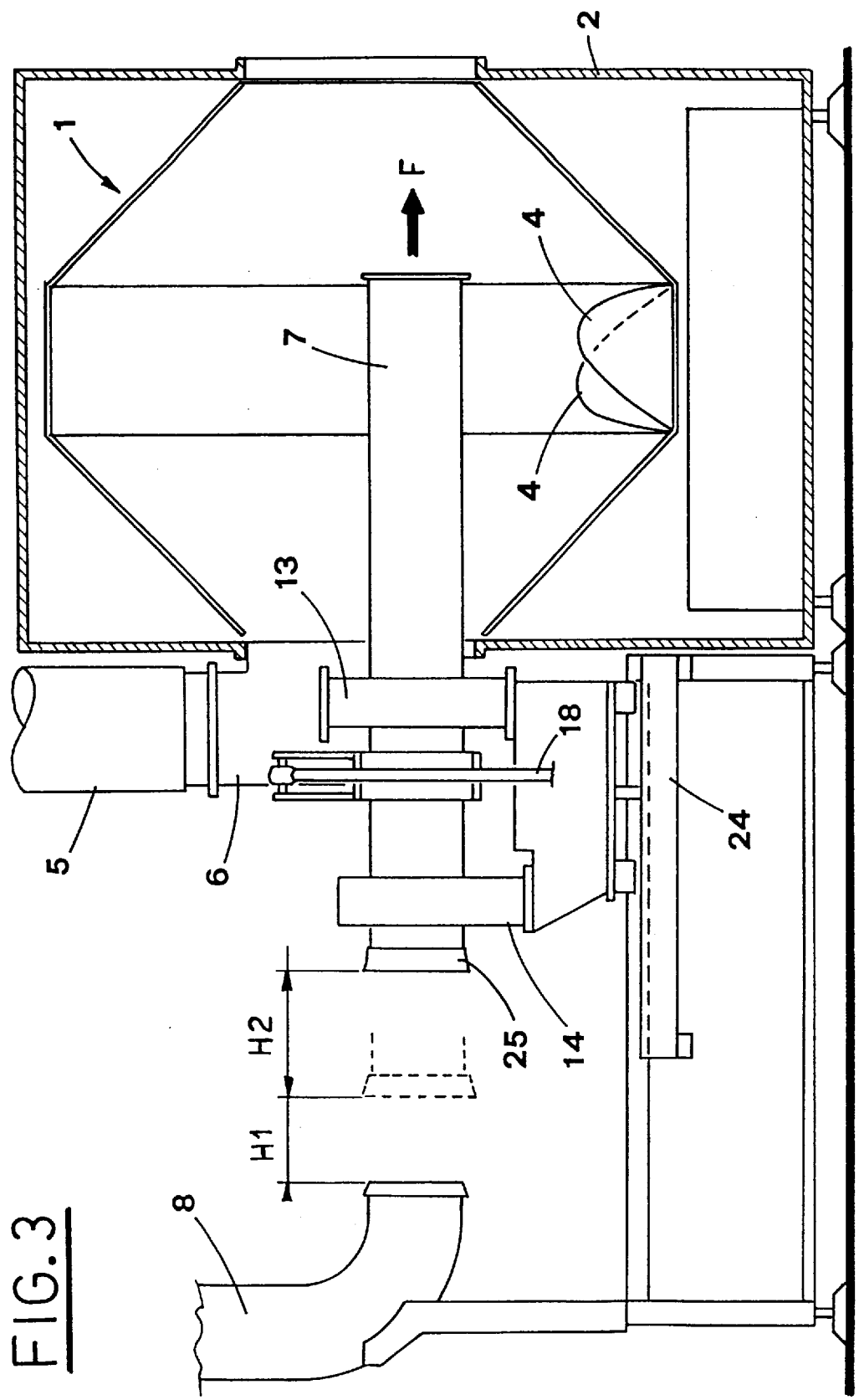

Afterwards, the pipe 7 is moved (still in the direction F), by another distance $H_2$ (FIG. 3), thus allowing the operator, still from outside the pan, to remove the tubular section 10 from the remaining part of the pipe 7, through the opening 3a.

Also in this case, if it is desired, the hollow body 9b can be previously removed from the respective tubular section 10.

The proposed device allows to disassemble, from outside through the opening 3a, the air exhausting means (hollow bodies 9a, 9b and tubular sections 10, 11), thus avoiding the disadvantages mentioned in the introduction.

It is to be pointed out that, after having been removed from the pipe 7, the hollow bodies 9a, 9b and the tubular sections 10, 11 can be cleaned separately in an accurate way.

Removal of the hollow bodies 9a, 9b and tubular sections 10, 11 facilitates also cleaning of the internal surface of the rotary pan 1.

What above, allows to perform, when needed, the maintenance operations on the removed elements.

Therefore, the described drying device achieves the object of facilitating cleaning and/or maintenance of the air exhaust means and of the internal parts of the rotary pan, by moving the pipe 7 towards the opening 3a.

Consequently, the same device becomes more efficient and the productivity of the coating machine rises.

We claim:

1. A coating machine for coating products comprising:

a rotary coating pan (1) having a front opening (3a) through which the products to be coated are introduced;

a drying device having means (5) for injecting air into the pan for drying the products, and, air exhaust means (7) having an end equipped with perforated hollow bodies (9a, 9b), adapted to be immersed in the products;

sliding means (21) supporting the exhaust means (7) for movement in a direction longitudinal to the exhaust means (7), between an operating position and at least one advanced position in which the end of the exhaust means (7) is in proximity to the front opening such that the exhaust means can be disassembled by an operator located outside the pan adjacent to the front opening.

2. The machine according to claim 1 wherein the sliding means support the exhaust means outside of the rotary pan in a cantilevered way so that the end of the exhaust means equipped with the hollow bodies (9a, 9b) is supported in the rotary pan thereby.

3. The machine according to claim 1 further comprising a pair of supporting means (13,14), integral with the sliding means, each supporting means having respective rollers (15,16) that rotatably support the exhaust means (7).

4. The machine according to claim 1 further comprising means for rotatably supporting the exhaust means (7), and lever means (19) fastened to an outer surface of the exhaust means, actuator means (17) connected to the lever means such that the exhaust means is rotatably displaced by the actuator means acting on the lever means.

5. The machine according to claim 1 wherein the slide means (21) have a slide carried by longitudinal guides (22), actuator means (24), attached to the slide and arranged longitudinally to the guides (22), for moving the exhaust means from the operating position to at least one advanced position.

6. The machine according to claim 5 wherein the guides (22) are made integral with stationary frame (2) of the machine.

7. The machine according to claim 1 wherein the end of the exhaust means (7) is movable to at least two advanced positions, towards the front opening (3a), these positions being at least two consecutive distances of predetermined length ($H_1$ $H_2$).

8. The machine according to claim 1 wherein the exhaust means (7) has a ring-like mouthpiece (25) adapted for connection to an air discharge duct (8).

9. The machine according to claim 1 wherein the exhaust means (7) is a pipe.

10. The machine according to claim 1 further comprising an intermediate tubular member (10) and an end member (11) connected coaxially with the end of the exhaust means (7), each member being removable through the front opening (39) by the operator.

* * * * *